Figure 1:
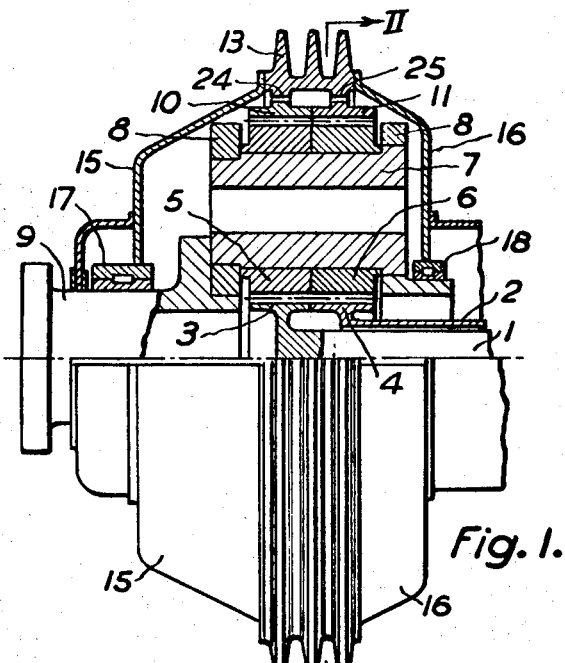

July 23, 1968     P. H. CLEFF     3,393,584
EPICYCLIC GEARS

Filed Aug. 9, 1966     5 Sheets-Sheet 1

Inventor
P. H. Cleff
By Watson, Cole, Grindle & Watson
Attys.

July 23, 1968 P. H. CLEFF 3,393,584
EPICYCLIC GEARS

Filed Aug. 9, 1966 5 Sheets-Sheet 2

Inventor
P. H. Cleff
By
Watson, Cole, Grindle & Watson
Attys.

July 23, 1968   P. H. CLEFF   3,393,584
EPICYCLIC GEARS
Filed Aug. 9, 1966   5 Sheets-Sheet 3

Inventor
P. H. Cleff
By
Watson, Cole, Grindle & Watson
Attys.

July 23, 1968  P. H. CLEFF  3,393,584
EPICYCLIC GEARS

Filed Aug. 9, 1966  5 Sheets-Sheet 4

Inventor
P. H. Cleff
By
Watson Cole Grindle + Watson
Attys.

July 23, 1968  P. H. CLEFF  3,393,584
EPICYCLIC GEARS
Filed Aug. 9, 1966  5 Sheets-Sheet 5

Inventor
P. H. Cleff
By Watson, Cole, Grindle & Watson
Attys.

United States Patent Office 3,393,584
Patented July 23, 1968

3,393,584
EPICYCLIC GEARS
Peter Herbert Cleff, Wallsend Research Station, Wallsend on Tyne, Northumberland, England
Filed Aug. 9, 1966, Ser. No. 571,292
Claims priority, application Great Britain, Aug. 11, 1965, 34,454/65
9 Claims. (Cl. 74—801)

The present invention relates to epicyclic gears having a plurality of planet wheels journalled in a carrier and meshing between a (central) sun pinion and an internally toothed annulus, whether of the "star" type, i.e., the type in which the planet carrier is stationary in operation and the annulus rotates at a lower speed than and in the opposite direction to, the sun pinion, or of the "planet" type, i.e., the type in which the annulus is stationary and the planet carrier rotates at a lower speed than and in the same direction as, the sun pinion.

It is known that in such epicyclic gears, strictly equal sharing of load between planet wheels is desirable but impossible of perfect achievement on account of unavoidable errors in the dimensions of critical components. It is however, possible to improve the degree of load sharing by providing flexible support for all or some of the co-operating components, and various proposals to this end have been made in the past.

Basically, flexible support can be applied to any of the three main members which transmit torque when the gear is in operation, viz. the sun pinion, the planet carrier, or the annulus. In the case of the sun pinion such support must be applied between the pinion and the shaft and the limited space which can be made available presents difficulties. In the case of the planet carrier or the annulus space is more easily made available for support and the diameter is larger and hence the tangential forces are smaller. The provision of flexible support for one of the three members referred to while improving load sharing between the planet wheels allows relaxation of tolerances not only on the member immediately concerned and a separate member through which the torque is transmitted, but also to the rest of the gear, that is to the other two of the members referred to and also to the planet wheels and the central sun pinion and their mountings.

An object of the present invention is to provide simple and cheap means for the flexible support of one of the two members annulus and planet carrier. Because of the difficulties above referred to, the invention does not contemplate flexible support of the sun pinion.

According to the invention one of the two members, annulus and planet carrier, and a separate member through which the torque acting on the aforesaid member is transmitted, include concentric portions, which portions have a plurality of corresponding axial slots, the two slots of each pair widening towards one another, and each pair of slots contains a loose spacer pin and at least one leaf spring on each side of the spacer pin, the extremities of each spring respectively engaging one side of each of the two slots of the pair.

The invention is applicable to the case in which the flexibly supported member rotates in operation (i.e., the annulus in a "start" type gear and the planet carrier in a "planet" type gear) but is preferably applied to the member which remains stationary in operation (i.e., the planet carrier in the "star" type gear and the annulus in the "planet" type gear) in which case the separate member may be constituted by the so-called strongback part of the gear case. It is also preferred to apply the flexible support to the annulus because this in any event presents a peripherally continuous body in which the axial slots are conveniently provided and because it is the largest diameter member so that the tangential forces to be transmitted are the smallest.

The invention will be further described with reference to the accompanying drawings.

Figure 2:
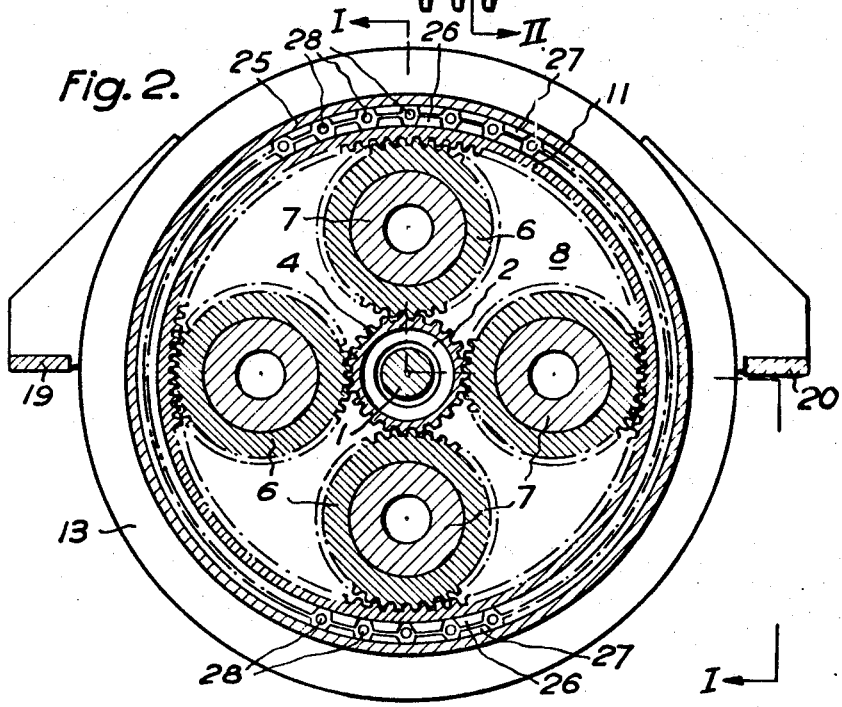

FIGURE 1 is a side view and part section on the line I—I of FIGURE 2 through one of the planet systems of a typical epicyclic gear of planet type, and FIGURE 2 is a transverse section through the gear on the line II—II of FIGURE 1. FIGURES 1 and 2 serve to define the location of components.

Figure 3:
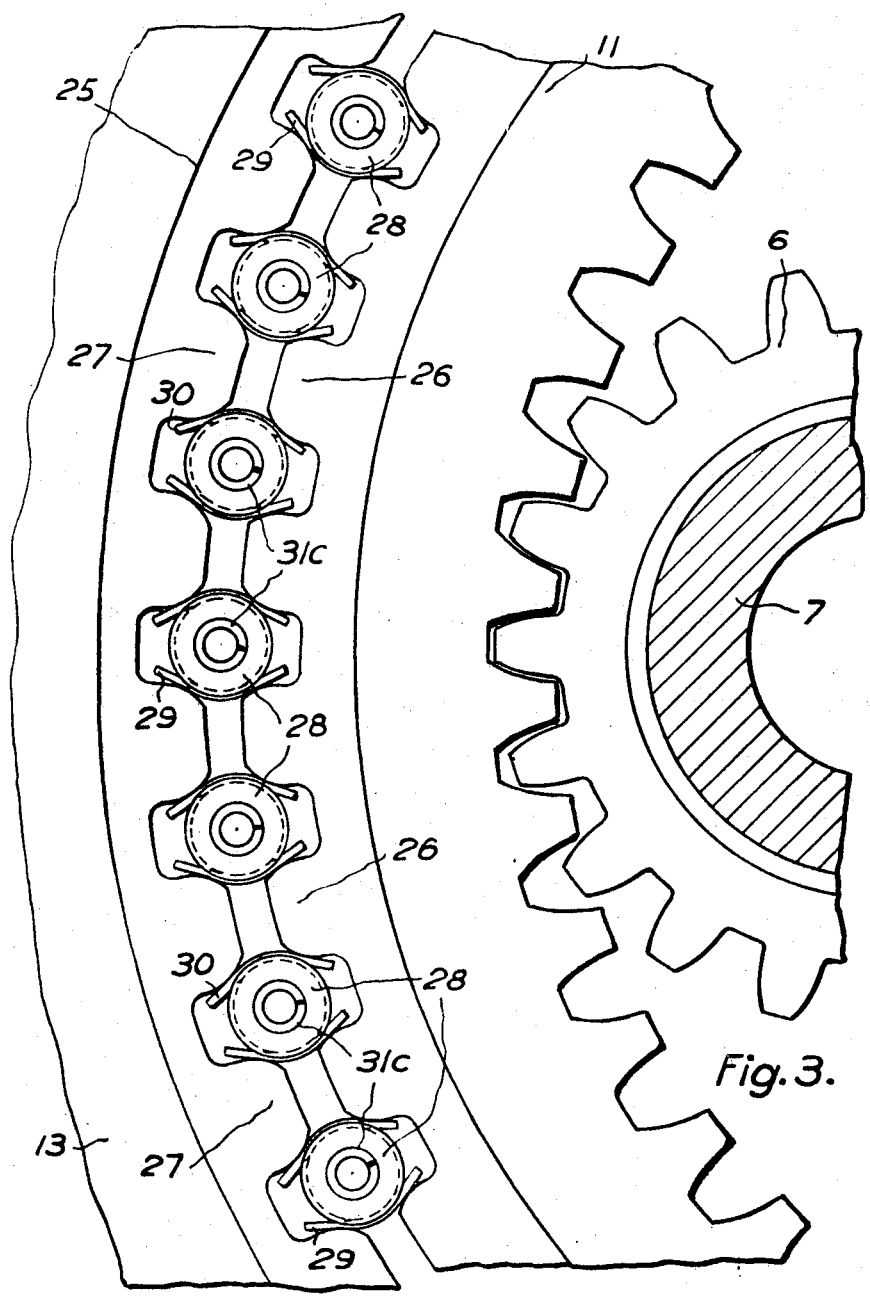
Figure 4:
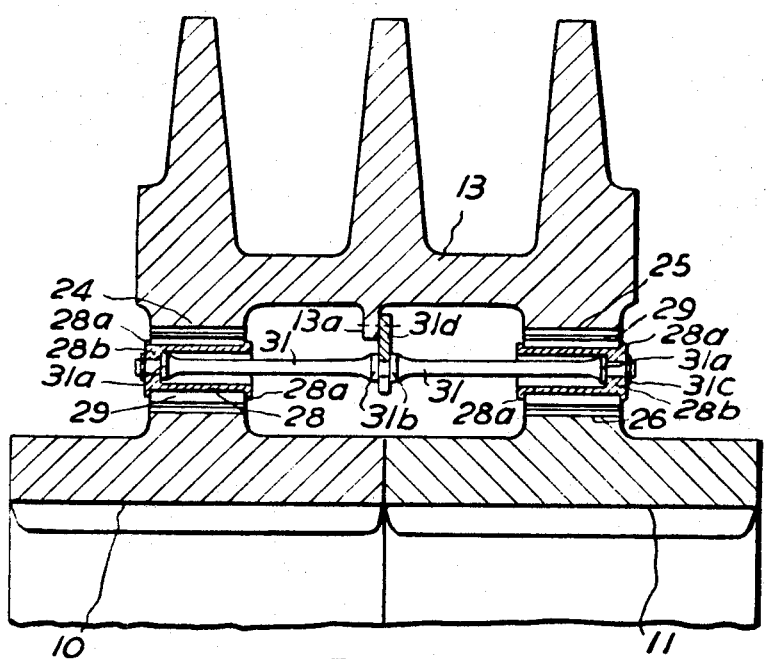
Figure 5:
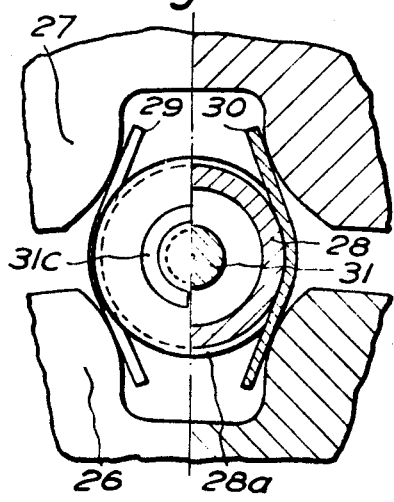
Figure 6:
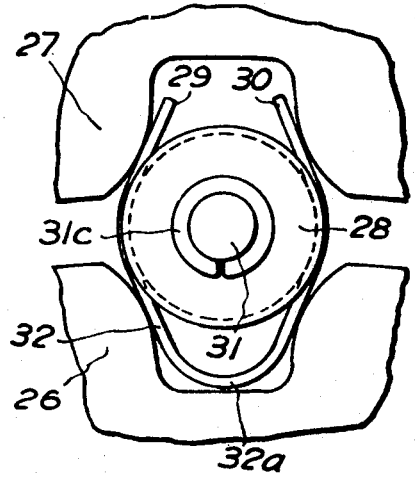
Figures 7, 13:
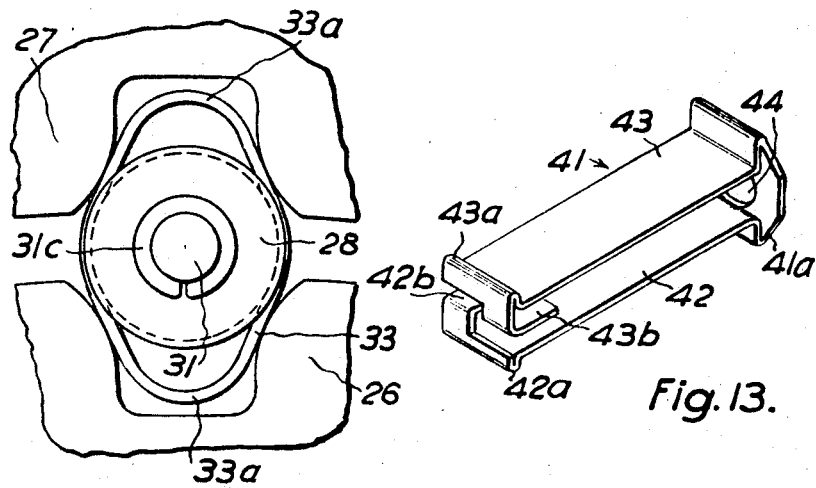
Figure 8:
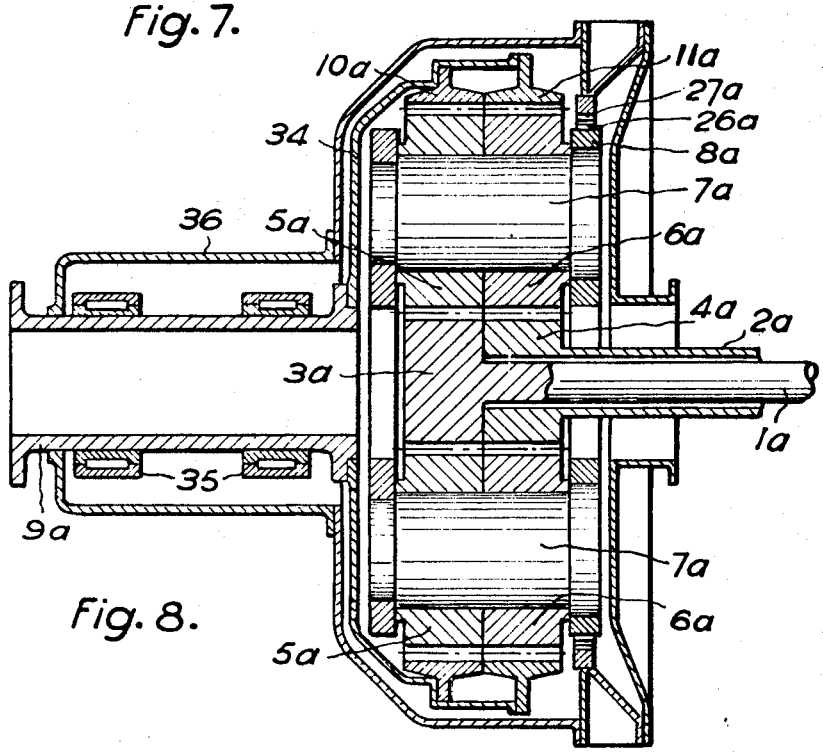
Figure 9:
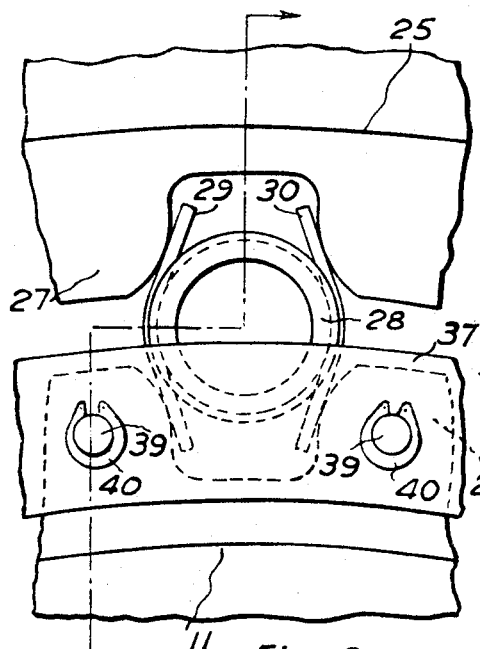
Figure 10:
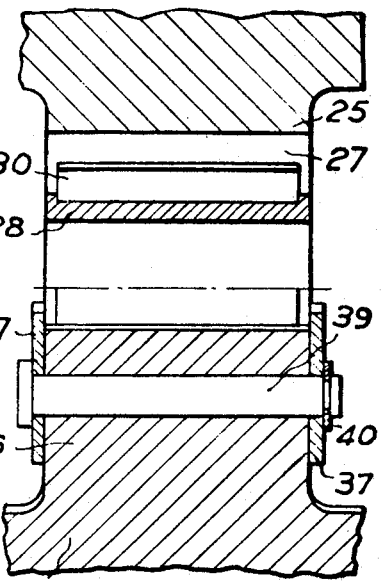
Figure 11:
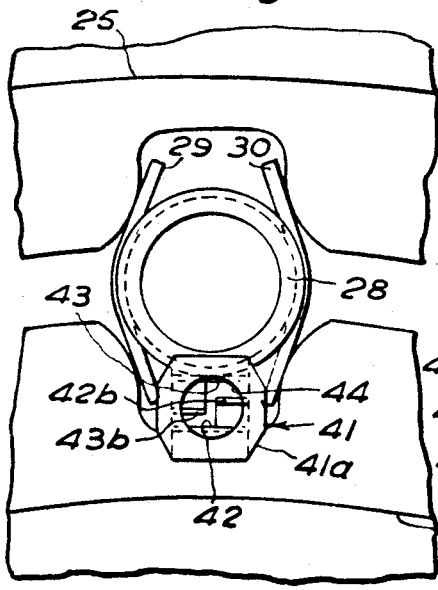
Figure 12:
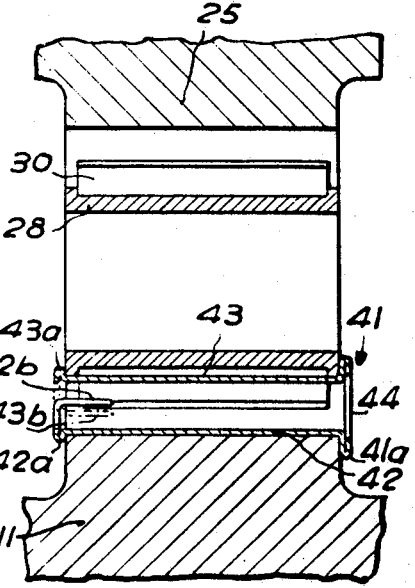

FIGURE 3 is a transverse section, which, on a larger scale than FIGURE 2, illustrates the position of the elastic suspension forming the flexible support which is the subject of the present invention, and FIGURE 4, on the same larger scale, is a longitudinal section on the line I—I of FIGURE 1, of the top part of FIGURE 3, FIGURE 5, on a still larger scale, shows a view (in an axial direction), of a single pin and springs arrangement, FIGURES 6 and 7 show two modifications of FIGURE 5, FIGURE 8 is a view similar to FIGURE 1 but showing the application of the flexible support to the planet carrier, FIGURE 9 is a detail side view and FIGURE 10 a detail section illustrating one alternative to FIGURE 4 for retaining the pin and spring assemblies, FIGURE 11 is a detail side view, FIGURE 12 a detail section and FIGURE 13 a perspective view illustrating another alternative to FIGURE 4 for retaining the pin and spring assemblies.

In FIGURE 1, 1 and 2 are input shafts, connected in parallel and driving (central) sun pinions 3 and 4. These mesh with planet wheels 5 and 6 respectively, which are journalled on the planet carrier pins 7. The planet carrier pins 7 are fastened in the planet carrier 8 which is rigidly connected with the output shaft 9. The planet wheels 5 and 6 also mesh with internally toothed annuli 10 and 11 respectively. The annuli are flexibly supported on internal sprockets 24 and 25 by means of the pin and springs assemblies which are not shown in this figure because of its scale but which are described below in relation to FIGURES 3, 4, 5, 6 and 7. The sprockets 24 and 25 are parts of the strongback 13 which supports the gear case shells 15 and 16. The strongback also supports, in a manner not detailed, the main bearings 17 and 18.

In FIGURE 2, the only additional parts are the palms 19 and 20, by which the strongback is supported, by way of example, on pedestals which will also take the torque reaction forces to earth.

In FIGURE 3, are shown a series of external sprocket teeth 26 on one of the annuli, say annulus 11 and a corresponding series of internal sprocket teeth 27 on one of the sprockets, say sprocket 25. In the axial slots between adjacent teeth 26, 26 and 27, 27 are accommodated spacer pins 28 which hold apart spring leaves 29 and 30 (shown on a larger scale in FIGURE 5). The axial slots of each pair diverge towards one another and the contour of their sides is convexly curved.

In FIGURE 4 are shown apart from the components enumerated above with reference to FIGURE 3, means for retaining the pin/springs assemblies in the sprockets. Many ways of doing this are possible, only one of these is illustrated in this figure. It appears somewhat complex but it has easy accessibility.

The pins 28 are shown equipped at each end with flanges 28a which serve to retain the leaf springs 29 and 30 axially as seen in FIGURE 4. Each pin 28 is closed at one end by a bottom 28b having a central through hole. Through this hole reaches a bar 31 which has flanges 31a by which it engages the bottoms 28b of pins 28. The bar 31 is also equipped with flanges 31b with which it engages a tab or a half ring 31d which is fastened to the internal flange 13a of the strongback 13. Finally, the pin/springs assemblies are retained against wandering outward by circlips 31c, which are sprung into grooves near the free ends of bars 31.

In FIGURE 5 is shown a group of 4 adjacent sprocket teeth and the pin 28 and leaf springs 29 and 30. The leaf springs are retained in relation to the spacer pin by the flanges 28a and, if no torque is transmitted, are sprung lightly into the inter-tooth spaces so as to eliminate backlash. If torque is transmitted in one way or the other, due to the convex curvature of the sides of the slots, the leaf springs are rolled on or off the teeth which they contact. Consequently the resonant frequency of the supported system becomes higher if the torque increases. This is a desirable feature as it ensures automatic detuning and thus precludes the buildup of large vibration amplitudes.

FIGURE 6 shows a variation. Instead of two separate leaf springs 29 and 30 the two springs are united at one end so that a single U-shaped spring 32 is used. It is a feature of this spring that it is made comparatively weak and hence more flexible in the connecting section 32a which can be achieved by local reduction in cross section.

FIGURES 1 and 2 illustrate the application of the invention to a gear of the "planet" type in which the annulus is held stationary.

FIGURE 8 illustrates the application of the invention to a gear of the "star" type in which the planet carrier is stationary and the flexible support is applied to the planet carrier. As in FIGURES 1 and 2, 1a and 2a are input shafts connected in parallel and driving (central) sun pinions 3a and 4a. These mesh with planet wheels 5a and 6a respectively which are journalled on the planet carrier pins 7a. In this example however, the planet carrier is held stationary and the annuli 10a, 11a are rigidly connected by a holder 34 to the output shaft 9a which is supported in bearings 35, themselves mounted in an outer casing 36. In the casing 36 is supported an outer sprocket member 27a while the planet carrier 8a carries a sprocket member 26a concentrically within the sprocket member 27a. These two sprocket members are formed similarly to the sprocket members 26 and 27 in FIGURES 1 and 2 and are similarly flexibly connected by pin and spring assemblies which can be of any of the forms above described and need no further detailed description here. These assemblies can be retained axially as described above with reference to FIGURE 4 or as now to be described with reference to FIGURES 9 to 13.

FIGURES 9 and 10 illustrate one alternative axial retaining arangement to that shown in FIGURE 4. Here, an annular cheek plate 37 (which may be in parts) is of such size as to overlap the ends of the pin 28 thus preventing relative axial movement. The plates 37 are held in place by headed pin 39 which are a friction (light drive) fit in holes in the sprocket and are driven from the side which is inaccessible or less accessible after assembly. The end of the pin which protrudes on the accessible side is grooved and receives a circlip 40 which retains the plate 37 on that side. This plate is therefore easily removable for disassembly of the parts. The plates 37 instead of on the inner sprocket could equally well be used on the outer sprocket.

In the alternative shown in FIGURES 11 to 13 a metal clip 41 of the form shown in FIGURE 13 is passed between the pin 28 and the base of the space between the sprocket teeth. Its head 41a is large enough to overlap the pin 28 and the sprocket while at its other end it is shaped so that a shoulder 42a on one limb 42 springs over the edge of the sprocket and a shoulder 43a on another limb 43 springs over the end of the pin 28. This clip is readily inserted from the accessible end of the sprocket by simply pressing the limbs together enough to admit the shoulders 42a, 43a between the end of the pin and the root of the sprocket space. To remove this clip a screwdriver or similar tool is entered through an opening 44 at the accessible end of the clip and its blade is engaged with respective lugs 42b, 43b. By twisting the screw driver the two limbs are flexed inwardly sufficiently for the two shoulders 42a, 43a to clear the end of the sprocket and the clip can then be withdrawn enabling the parts to be disassembled.

The illustrated examples have only one spring on each side of the spacer pin. There may be two or more on each side, and if the springs on opposite sides are to be united as in FIGURE 6 or 7 usually the spring on one side will be united to the corresponding spring on the other. In some cases however, for instance when torque in one direction only is to be provided asymmetrical arrangements may be desirable, for example more springs on one side than the other, or springs of different strength on opposite sides.

It will be understood that in general with two trains in parallel as in FIGURES 1 and 8 the two sun pinions and annuli will be helically toothed to opposite hands, the planet wheels being correspondingly toothed.

I claim:
1. An epicyclic gear having a plurality of planet wheels journalled on a planet carrier and meshing between a sun pinion and an internally toothed annulus, in which one of the two members annulus and planet carrier and a separate member through which the torque acting on the aforesaid member is transmitted, include concentric portions, which portions have a plurality of corresponding axial slots, the two slots of each pair widening towards one another, and each pair of slots contains a loose spacer pin and at least one leaf spring on each side of the spacer pin, the extremities of each spring respectively engaging one side of each of the two slots of the pair.

2. An epicyclic gear according to claim 1 in which the aforesaid member remains stationary in the operation of the gear and the separate member is constituted by a strongback part of the gear case.

3. An epicyclic gear according to claim 2 in which the aforesaid member is the annulus.

4. An epicyclic gear according to claim 1 in which the contour of the sides of the slots is convexly curved.

5. An epicyclic gear according to claim 1 in which each leaf spring on one side of a spacer pin is united at one end with the corresponding leaf spring on the other side by a section of greater flexibility than the springs themselves.

6. An epicyclic gear according to claim 1 in which each leaf spring on one side of a spacer pin is united at both ends with the corresponding leaf spring on the other side by sections of greater flexibility than the springs themselves.

7. An epicyclic gear according to claim 2 in which the leaf springs are retained axially by flanges in the spacer pins, and the spacer pins are retained axially by bars axially extending within and attached to the pins and to the strongback.

8. An epicyclic gear according to claim 1 in which the leaf springs are retained axially by flanges on the spacer pins and the spacer pins are retained axially by annular cheek plates held in place by headed pins which are a friction fit in holes in one of the two members between which the spacer pins and springs are engaged, the shank of the headed pin protruding through one of the cheek plates and there receiving a circlip.

9. An epicyclic gear according to claim 1 in which the leaf springs are retained axially by flanges on the spacer pins and the spacer pins are retained axially by spring clips, each clip having a head large enough to overlap a spacer pin and one end of one of the members with which the spacer pins and springs are engaged and having two limbs with flanges respectively overlapping the other end of said member and the spacer pin, the limbs of the clip terminating in internal lugs accessible through a hole in the head of the clip.

References Cited

UNITED STATES PATENTS

| | | | |
|---|---|---|---|
| 1,234,213 | 7/1917 | Reno | 74—410 |
| 1,475,902 | 11/1923 | Thompson | 74—410 X |
| 2,066,223 | 12/1936 | Pielstick | 74—410 X |
| 2,868,040 | 1/1959 | Chamberlin | 74—801 |
| 3,090,258 | 5/1963 | Zink et al. | 74—801 |
| 3,206,993 | 9/1965 | Niemann | 74—410 |
| 3,352,177 | 11/1967 | Cleff et al. | 74—801 |

FOREIGN PATENTS

| | | |
|---|---|---|
| 903,495 | 8/1962 | Great Britain. |
| 263,152 | 3/1929 | Italy. |

FRED C. MATTERN, Jr., *Primary Examiner.*

THOMAS C. PERRY, *Assistant Examiner.*